(12) United States Patent
Belwafa et al.

(10) Patent No.: US 8,480,125 B1
(45) Date of Patent: Jul. 9, 2013

(54) CURTAIN AIR BAG SYSTEM

(75) Inventors: Jamel E. Belwafa, Ann Arbor, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/367,472

(22) Filed: Feb. 7, 2012

(51) Int. Cl.
*B60R 21/21* (2011.01)

(52) U.S. Cl.
USPC ...................................................... 280/730.2

(58) Field of Classification Search
USPC .................... 280/728.3, 730.2, 743.1, 749
See application file for complete search history.

(56) References Cited

U.S. PATENT DOCUMENTS

| | | | |
|---|---|---|---|
| 5,316,336 A * | 5/1994 | Taguchi et al. | 280/730.2 |
| 6,508,486 B1 | 1/2003 | Welch et al. | |
| 6,773,031 B2 * | 8/2004 | Haig | 280/749 |
| 7,384,063 B2 | 6/2008 | Riester et al. | |
| 7,413,215 B2 | 8/2008 | Weston et al. | |
| 7,568,722 B2 | 8/2009 | Sato et al. | |
| 7,578,518 B2 | 8/2009 | Ochiai et al. | |
| 7,581,751 B2 | 9/2009 | Ochiai et al. | |
| 7,828,322 B2 | 11/2010 | Breuninger et al. | |
| 7,967,334 B2 | 6/2011 | Breuninger et al. | |
| 2005/0206138 A1 | 9/2005 | Breuninger et al. | |
| 2008/0179865 A1 | 7/2008 | Valdez et al. | |
| 2010/0096842 A1 | 4/2010 | Valdez et al. | |
| 2011/0012328 A1 | 1/2011 | Ewing et al. | |
| 2011/0248484 A1 | 10/2011 | Scott et al. | |
| 2012/0193897 A1 * | 8/2012 | Ruedisueli et al. | 280/730.2 |

* cited by examiner

*Primary Examiner* — Joseph Rocca
*Assistant Examiner* — Robert A Coker
(74) *Attorney, Agent, or Firm* — Frank A. MacKenzie; Brooks Kushman P.C.

(57) ABSTRACT

An airbag module for an automotive vehicle includes a housing securable to a vehicle body panel adjacent to a sill of a side window. An airbag is stored within the housing in a deflated condition and has an inflated condition wherein it is positioned above the sill. A tether has an upper end attached to the airbag adjacent the top portion and a lower end attached to the body portion or the airbag bottom portion. The tether is shorter than a vertical length measured along a surface of the airbag between the top portion and the bottom portion when in the inflated condition, such that the tether is placed in tension and holds the airbag in a bent condition wherein a center section between the top and bottom portions projects laterally inward toward an interior of the vehicle.

10 Claims, 4 Drawing Sheets

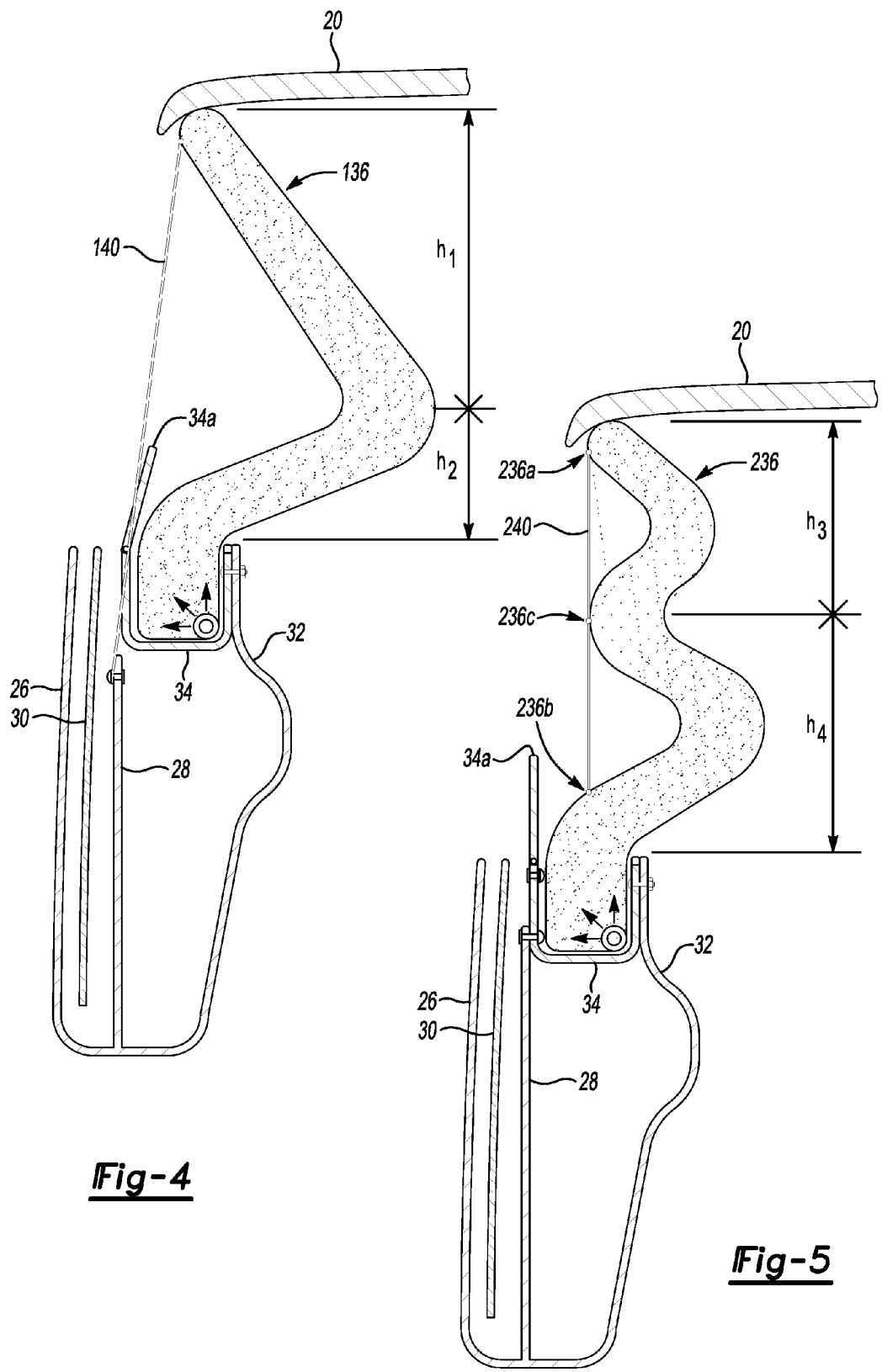

CURTAIN AIR BAG SYSTEM

TECHNICAL FIELD

The invention relates to curtain airbag systems for occupant protection in motor vehicles.

BACKGROUND

Curtain airbag systems are intended to protect vehicle occupants in the event of a collision or other accident in two general ways. Firstly, in the event of, the curtain airbag provides cushioning for the head, shoulder, and upper body of an occupant between the side window grasps and/or the pillars and/or other side structure of the vehicle. Secondly, curtain airbags are intended to reduce the likelihood that the head, arm, or any other portion of the occupant may be forced out through the window opening during a crash event, whether the window glass is in the raised/closed position or the lowered/opened position.

In some vehicle applications, it may be desirable to position curtain airbags within or near the upper edge of a door or other side body panel of a vehicle so that the airbags deploy upward during inflation. Among the instances where this may be preferable are convertible-top vehicles, since the convertible may not provide adequate space for mounting an airbag or airbag module, and/or the convertible roof may be lowered or stowed so that a roof-mounted airbag will not be available to protect occupants. A door-mounted curtain airbag may also be preferred when styling or package constraints require a slim side roof rail.

In vehicle applications where the airbags are positioned within the door, it is advantageous for the curtain airbag to have geometry such that the occupant is kept within the vehicle and also receives the level of cushioning required during a crash event. It also advantageous for the curtain airbag to be constructed in such a manner that the packaging space and material required is at a minimum.

SUMMARY

In a disclosed embodiment, apparatus comprises a vehicle body portion defining a sill of a window opening and an airbag stored within the body portion in a deflated condition. The bottom portion of the airbag is secured to the sill and when in its inflated condition the airbag is positioned above the sill. A tether has an upper end attached to a top portion of the airbag and a lower end attached to either the body portion or the airbag bottom portion. The tether is shorter than a vertical length of the airbag measured along its surface between the upper and lower ends of the tether, such that the tether holds the airbag, when in the inflated condition, in a bent condition wherein a center section projects laterally inward toward an interior of the vehicle.

In another disclosed embodiment, an airbag module for an automotive vehicle comprises a housing securable to a vehicle body panel adjacent to a sill of a side window, an airbag stored within the housing in a deflated condition and having an inflated condition wherein it is positioned above the sill, and a tether having an upper end attached to the airbag adjacent the top portion and a lower end attached to the body portion or the airbag bottom portion. The tether is shorter than a vertical length measured along a surface of the airbag between the top portion and the bottom portion when in the inflated condition, such that the tether is placed in tension and holds the airbag in a bent condition wherein a center section between the top and bottom portions projects laterally inward toward an interior of the vehicle.

BRIEF DESCRIPTION OF THE DRAWINGS

FIG. 4 is a cross-sectional schematic view showing an alternative embodiment of a curtain airbag in a deployed condition;

FIG. 5 is a cross-sectional schematic view showing another alternative embodiment of a curtain airbag.

DETAILED DESCRIPTION

Figure 1:
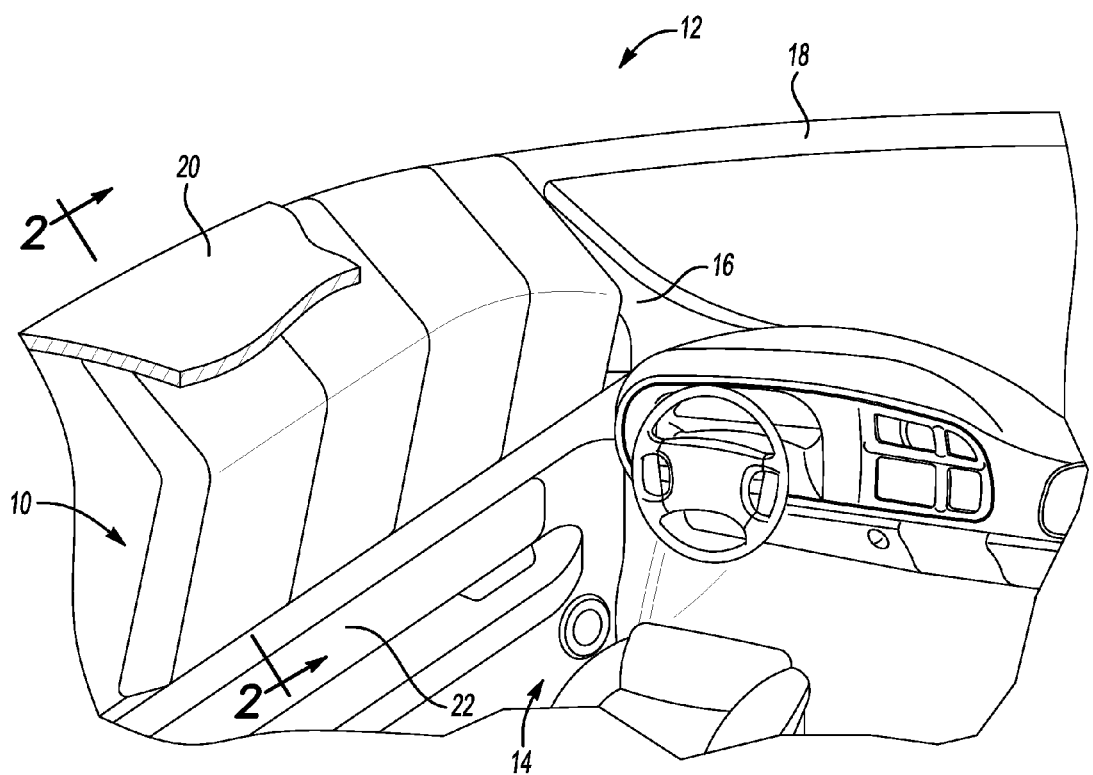
FIG. 1 is a schematic diagram of a vehicle environment including a curtain airbag system.

FIG. 1 is a schematic diagram of a curtain airbag module 10 in a motor vehicle environment, showing the airbag in a deployed condition. The motor vehicle 12 has a passenger compartment 14, a forward pillar 16, an upper windshield frame 18, and a door 22. Only a fragmentary portion of a roof 20 extending over passenger compartment 14, to avoid obscuring the view of passenger compartment 14. Although FIG. 1 shows curtain airbag module 10 to cover only the side window of a front seating row, the curtain airbag may extend farther to the rear and/or the front as necessary to provide coverage of the desired areas. Alternatively, separate curtain airbags and/or airbag modules may be provided for other seating rows.

Figure 2:
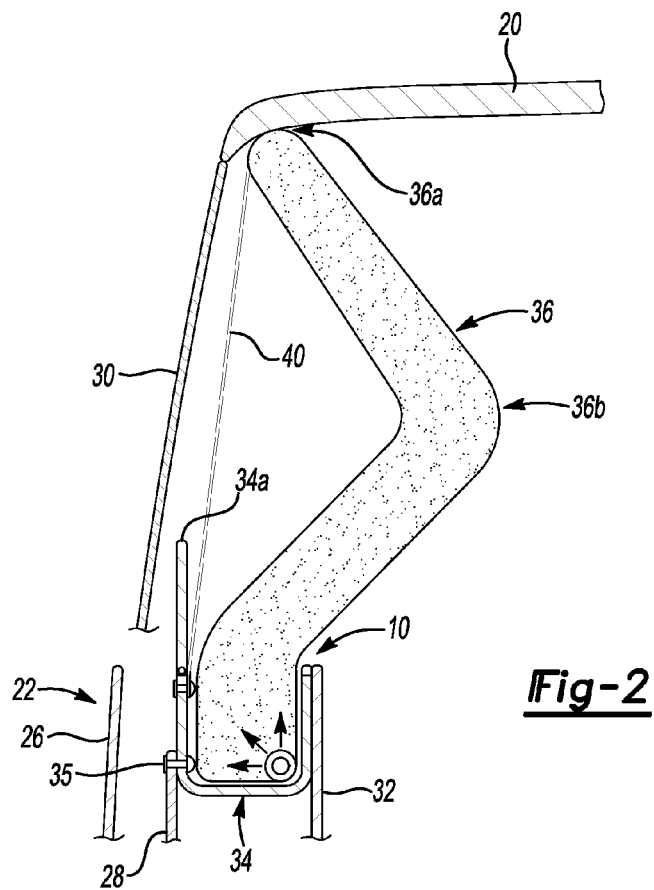
FIG. 2 is a schematic cross-sectional view along line 2-2 of FIG. 1.
Figure 3:
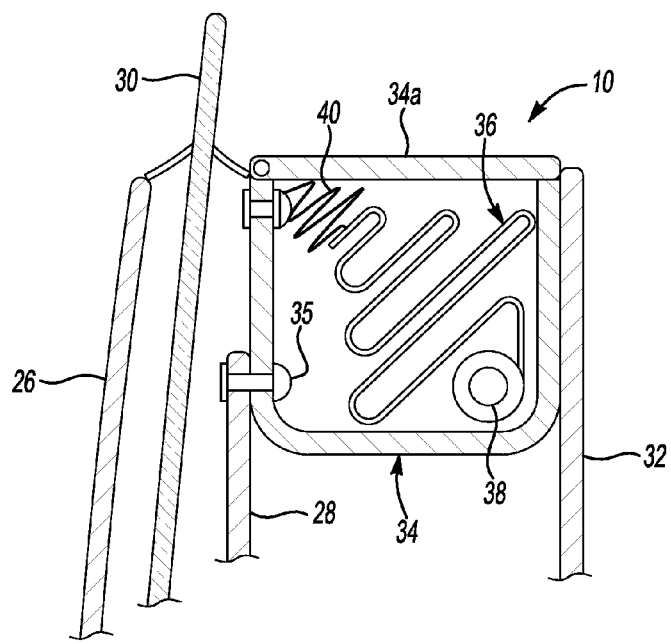
FIG. 3 is a schematic cross-sectional view similar to FIG. 2 showing the airbag in a stowed condition.

FIGS. 2 and 3 are cross-sectional views looking forward through door 22, with the airbag module 10 in the deployed and stowed conditions, respectively. Door 22 generally comprises an outer structural panel 26, an inner structural panel 28, a vertically movable window panel 30, and an inner door trim panel 32. Outer and inner structural panels 26, 28 are made of high-strength material (metal, most commonly, but more advanced materials such as carbon fiber or other composites may be used) and inner trim panel 32 is typically made of a plastic or fiber-reinforced plastic material.

The upper edge of door 22 forms the sill of the side window opening over which window panel 30 extends when in its up/closed position. An airbag housing 34 is secured to inner door panel 28 adjacent the upper edge of door 22. Airbag housing 34 may be secured to inner door panel 28 at one or more points by any appropriate means, such as the rivet 35 shown. Alternatively, the airbag housing 34 may be secured to the door trim panel 32 at one or more points by any appropriate means such as hot sticks or screws.

Airbag housing 34 extends along all or a portion of the window sill and contains an airbag 36 stored in a deflated condition and an inflator 38. In the stored condition, airbag 36 is folded, rolled, or otherwise made compact to fit within housing 34.

A tether 40 is also stored in a folded condition within airbag housing 34. Tether 40 has a first end connected to an upper portion 36a of the airbag and a second end connected to airbag housing 34. Tether 40 is a flexible but substantially inextensible member, and may take the form of a relatively narrow cord or strap, or it may be a wider panel of material such as is often referred to as a sail panel in the occupant safety field. Tether 40 may be attached to airbag 36 by appropriate means such as stitching and/or adhesive, and to airbag housing by appropriate means such as a bolt, rivet, or push-in fastener. Multiple tethers may be located at spaced locations along the length of airbag 36 and door 22.

When inflator 38 is triggered by an occupant safety system controller (not shown) it releases gases into airbag 36, causing it to expand upwardly out of airbag housing 34 to the deployed position shown in FIG. 2. Airbag housing 34 may include a lid 34a which opens under the force of the expanding airbag, or the housing may be provided with weakened lines or seams designed to split under the pressure of the expanding airbag to permit the airbag to deploy.

Airbag 36 is formed of one or more fabric panels which are shaped and sewn to provide the angled (generally V- or L-shaped) inflated configuration depicted, in which the center section 36b projects inward into passenger compartment 14. Tether 40 is shorter than the total vertical length as measured along the surface of the airbag 36 so that the tether is placed in tension and holds the airbag in the angled shape even if an outwardly-directed force is applied to the airbag.

In the deployed condition, the upper-most portion of the airbag 36 may be positioned closely adjacent to or touching roof 20 close to the location where window panel 30 meets the roof when the window is in the up or closed position. The inward-projecting shape of deployed airbag 36 may, under some circumstances, provide improved occupant ejection mitigation. The distance which airbag 36 projects laterally into passenger cabin 14 and the vertical location of the maximum inward projection are designed to provide maximum safety benefit.

FIG. 4 depicts an embodiment of a curtain airbag installation in which the airbag 136 is shaped such that the height above the door sill at which the bag reaches its maximum lateral protrusion into the passenger cabin is lower than in the embodiment shown in FIG. 2. The vertical location of the maximum inward projection (that is, the ratio between dimensions $h_1$ and $h_2$) may be adjusted as necessary to achieve desired occupant protection goals, and may vary along the length of the airbag.

The FIG. 4 embodiment also differs from that of FIG. 2 in that the lower end of tether 140 is anchored to the inner door structure 28 rather than to airbag housing 34, airbag housing 34 is mounted to inner door trim panel 32.

FIG. 5 depicts an embodiment of a curtain airbag installation in which the airbag 236 when in the inflated condition has two inward projections, one above and one below an outward projection. Tether 240 is connected to the airbag at three spots: adjacent the upper portion of the airbag 236a, adjacent the lower portion of the airbag 236b, and at an intermediate location 236c on the outward projection. The vertical location of the outward projection (that is, the ratio between dimensions $h_3$ and $h_4$) may be varied as necessary to achieve desired occupant protection goals. It is also possible to configure the curtain airbag with more than two inward projections as necessary to achieve desired occupant protection goals.

Figure 6:
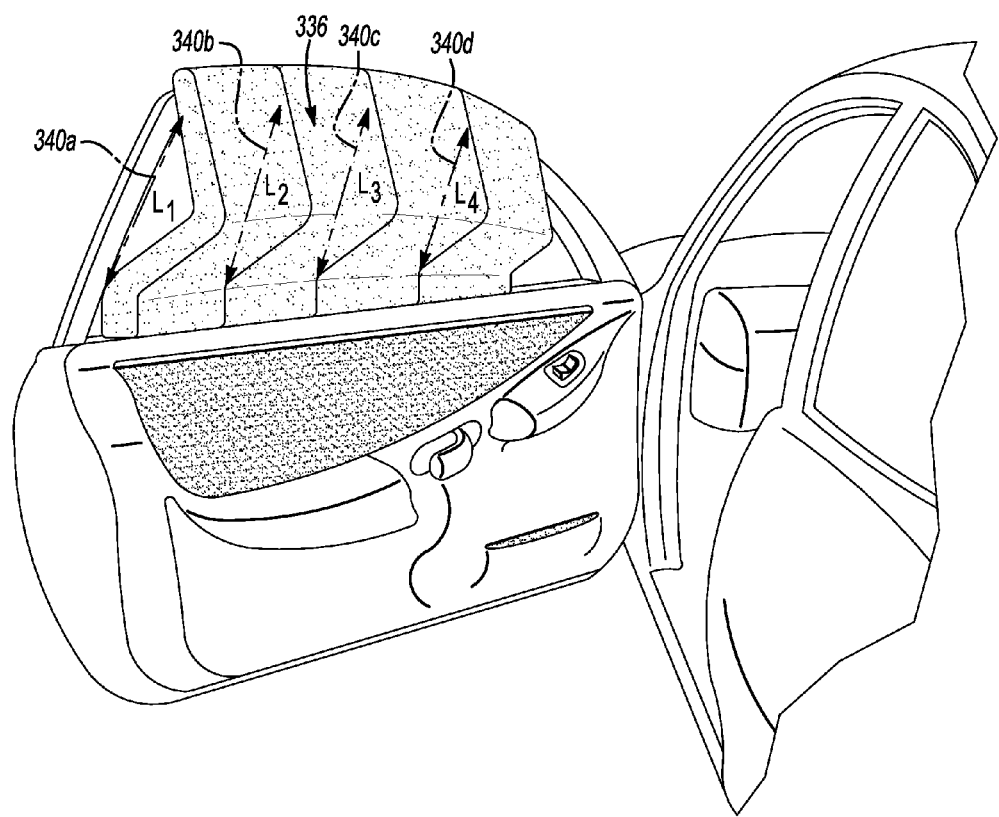
FIG. 6 is a partial schematic view of a curtain airbag having exterior tethers of varying lengths.

FIG. 6 shows a curtain airbag 336 having multiple tethers 340a, 340b, 340c, 340d spaced from one another along the length of the curtain airbag. The multiple tethers are shown to vary in length to tailor the shape of the airbag 336 (the amount by which the airbag center section projects inwardly) along the airbag length. The longitudinal spacing between any two adjacent tethers may also vary and be adjusted as necessary to meet occupant protection objectives. A similar effect may also be achieved by replacing the multiple tethers with a sail panel that varies in its vertical dimension along the length of the airbag.

While the curtain airbag module is shown herein mounted in a vehicle door, such a module may also be installed in a vehicle side panel other than a door, such as may be present in a van, truck, or other vehicle adjacent to a seat or a row of seats not provided with a door.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
   a vehicle body portion defining a sill of a window opening;
   an airbag stored in a deflated condition inside an airbag housing, the housing disposed within the body portion and secured to a panel of the body portion adjacent to the sill, the airbag having an inflated condition wherein it is positioned above the sill; and
   a tether having an upper end attached to a top portion of the airbag and a lower end attached to the panel below the airbag housing, the tether being shorter than a vertical length of the airbag measured along its surface between the upper and lower ends of the tether such that the tether holds the airbag, when in the inflated condition, in a bent condition wherein a center section projects laterally inward toward an interior of the vehicle.

2. The apparatus of claim 1 wherein the body portion is a door.

3. The apparatus of claim 1 further comprising a second tether spaced from the tether along a longitudinal axis of the airbag.

4. A motor vehicle comprising:
   a vehicle door defining a sill of a window opening;
   an airbag stored when deflated in an airbag housing disposed within the door adjacent to the sill, the housing having a deployment opening adjacent to the window opening to allow the airbag to deploy upward to an inflated condition wherein a lower portion of the airbag is attached to the housing and the airbag is positioned above the sill; and
   an external tether connecting an airbag upper portion with a panel of the door below the airbag housing, the tether being shorter than a total vertical dimension/length of the airbag in the inflated condition, the tether causing the inflated airbag to form a bend line projecting toward an interior of the vehicle.

5. The apparatus of claim 4 further comprising a second tether spaced from the tether along a longitudinal axis of the airbag.

6. An airbag module for an automotive vehicle comprising:
   a housing securable to a vehicle body panel adjacent to a sill of a side window;
   an airbag stored within the housing in a deflated condition and having an inflated condition wherein it is positioned above the sill; and a tether having an upper end attached to a top portion of the airbag and a lower end attached to the vehicle body panel below the housing, the tether being shorter than a vertical length measured along a surface of the airbag between the top portion and the bottom portion when in the inflated condition such that the tether holds the airbag in a bent condition wherein a center section between the top and bottom portions projects laterally inward toward an interior of the vehicle.

7. The apparatus of claim 6 wherein the tether is stored in the housing when the airbag is in the deflated condition.

8. The apparatus of claim 6 further comprising a second tether spaced from the tether along a longitudinal axis of the airbag.

9. The apparatus of claim 6 wherein the housing is secured to an inner structural panel of the door.

10. The apparatus of claim 6 wherein the housing has a hinged lid that opens to allow the airbag to inflate upwardly.

* * * * *